Patented Sept. 17, 1940

2,215,078

UNITED STATES PATENT OFFICE 2,215,078

PROCESS FOR THE MANUFACTURE OF FIREPROOF THERMAL AND ACOUSTICAL INSULATION ARTICLES

Conrad Gérard François Cavadino, Rochester, England, assignor to Gyproc Products Limited, London, England, a company of Great Britain No Drawing. Application April 23, 1938, Serial No. 203,813. In Great Britain April 26, 1937

12 Claims. (Cl. 106—18)

This invention relates to the manufacture of fireproof thermal and acoustical insulation articles and has for its object the utilization therefor of vermiculite after its expansion by heat or any such expanded vermiculite mineral such as cookeite, culsageite, dudleyite, halite, jefferisite, kerrite, lennilite, lucasite, maconite, painterite, philadelphite, pyrosclerite, zonolite, vaalite and the like. Vermiculite or vermiculitic minerals, the names of which hardly rank as distinct species, are micaceous minerals all hydrated silicates and alteration products chiefly of the micas such as biotite, phlogopite and chlorite to which they are in part closely related but varying rather widely in composition and hence they are of a more or less indefinite chemical nature while corresponding mostly to that of the original mineral but varying with the degree of alteration whilst retaining more or less perfectly some distinctive physical features of the original species from which they are derived, such as the softness, the pliability and elasticity of their laminae. When heated they lose their hygroscopic water and associated with this loss of water is their common physical property of exfoliation or expansion when slowly or rapidly opening out depending on the intensity of the heat applied and its length of duration when they form worm-like threads from which peculiarity their name is derived. The expansion obtained by heat may be of the order of five to ten or twelve times the original volume while the expanded material is highly refractory to heat as also of a highly resilient nature.

In the carrying out of the invention ordinary commercial sulphuric acid is diluted to a suitable extent with water and has added to it a predetermined amount of a hydrofluoric acid derivative such as for example calcium fluoride commonly called fluor spar, previously ground to a fine powder. Immediately a reaction sets in and a strong heat is engendered. While this reaction is proceeding and the heat is increasing to the liquid reacting slurry is added a suitable amount of expanded vermiculite which is stirred thoroughly through the liquid reacting slurry. This mixture digest is then left till cold when it will present itself as a plastic mass. To this plastic are further added a suitable proportion of previously expanded vermiculite the amount and the rate of expansion of which depend on the final character it is desired to impart to the final product or article; a suitable proportion of finely ground cork; and finally a suitable proportion of dry powdered clay. This mixture is then thoroughly kneaded whereafter it is ready to be moulded in any shape or form. The moulded article is first dried to expel its excess of free moisture and is thereafter burned at high heat of approximately 1150° C. After burning the article presents a solid and hard stone-like product of a peculiar cellular and honeycomb structure, eminently suitable for thermal and acoustical insulation purposes. If it is desired to impart to the final burnt article a higher degree of hardness or crushing strength a predetermined proportion of native chromite of iron is added to the plastic mass or the native chromite of iron is substituted in part or in total for the clay heretofore mentioned. A further advantage of the use of chromite of iron is to increase to an appreciable extent the refractoriness to heat of the vermiculite mineral.

Fireproof thermal insulation compositions and articles find application as interlining for all kinds of industrial kilns, ovens and furnaces such as coke and ceramic ovens, lime, cement and glass kilns as also as covers for boilers, steampipes, drying ovens and the like.

Temperatures in these however, vary considerably and with them heat and mechanical stresses, hence the mechanical and physical properties of such compositions and articles must be adapted according to case.

In carrying out the process it has been found that for purposes where heat stresses occur in addition to static pressure, such as for interlining in furnaces, the following compounding by weight may be suitable for the making, for example, of expanded vermiculite fireproof thermal insulation bricks, slabs and the like possessing a density of about 0.5 with a crushing strength of from 125 to 150 lbs. per square inch and a Kcal/mHr°C. insulation coefficient of 0.134 at temperatures of 400° C. In the middle and 720° C. at the heated face of the insulation brick or slab.

*Example 1*

|  | Percent |
|---|---|
| (a) Sulphuric acid | 13.44 |
| Water | 35.84 |
| Fluorspar | 6.72 |
|  | 56.00 |

To which (a) is added during reaction:
| (b) Expanded vermiculite | 20.00 |
|---|---|
|  | 76.00 |

To which (a) and (b) is added after digestion:
(c) Expanded vermiculite _____ 4.50
    Ground cork _____ 5.50
    Clay (either blue ball, china or bentonite) _____ 14.00
                                              ──────
                                              100.00

In cases where mechanical stresses are low, or practically absent and where a light article of good insulating efficiency is required such as for instance, for boiler or steam pipe insulation, the following compounding by weight may be found suitable for articles of this class with a density of about 0.33, a crushing strength or from 40 to 65 lbs. per square inch and a Kcal/mHr° C. insulation coefficient of 0.112 at temperatures of 400° C. in the middle and 720° C. at the heated face of an insulation brick or slab or sectional half.

*Example 2*

|  | Per cent |
|---|---|
| (a) Sulphuric acid | 4.56 |
| Water | 50.16 |
| Fluorspar | 2.28 |
|  | 57.00 |
| To which (a) is added during reaction: |  |
| (b) Expanded vermiculite | 6.25 |
|  | 63.25 |
| To which (a) and (b) is added after digestion: |  |
| (c) Expanded vermiculite | 18.75 |
| Ground cork | 4.00 |
| Clay (either blue ball, china or bentonite) | 14.00 |
|  | 100.00 |

After moulding the bricks or slabs or sectional halves are dried at a temperature of from 260° F. to 360° F. for about 16 hours to expel their excess moisture, whereafter, without any danger of cracking or bursting, they are immediately entered into a kiln at a high temperature of 1150° C. there to be burnt for a duration depending upon thickness but which duration corresponds to from one hour to 1½ hours per 1 inch thickness. After burning the red hot bricks or slabs or sectional halves can be directly removed from the kiln to cool in the open which takes from 30 to 45 minutes or the cooling process may be accelerated to some 15 minutes by blowing an air current on to them without the slightest danger of injuring them.

After cooling they are ready for despatch.

It should be expressly stated here that the invention is essentially based on the peculiar effect produced on expanded vermiculite when the latter is digested in the liquor resulting from the reaction of dilute sulphuric acid on a fluorine compound such as fluorspar as described sub (a) in the two examples set forth hereabove. The result of this reaction is to produce in part (a) of the examples, a liquor having a specific gravity of 25° B^e of the following chemical composition by weight.

|  | Per cent |
|---|---|
| Sulphuric acid | 12.23 |
| Hydrofluoric acid | 6.14 |
| Water | 81.63 |
|  | 100.00 |

In this reaction there is also produced a precipitate of calcium sulphate which may be eliminated or retained in the resultant liquor, according to case, when digesting the expanded vermiculite in the latter as hereinbefore described. The peculiar effect of the suchwise composed liquor which for convenience sake is called "reagent" is to impart to the expanded vermiculite after digestion therein with or without the presence of the precipitated calcium sulphate, cementitious properties which cannot be obtained by the use of either sulphuric acid or hydrofluoric acid separately by themselves alone.

It has been found that these cementitious properties are best promoted when the sulphuric acid and the hydrofluoric acid are present together in the "reagent" liquor at the ratio of approximately two parts by weight of sulphuric acid and one part by weight of hydrofluoric acid and in a solution having a specific gravity in the neighborhood of 25° B^e.

While examples which constitute practical embodiments of the invention have been described it is not intended to limit the invention precisely thereto or thereby for an ingredient may be omitted, other ingredients may be employed, changes may be made in the proportions of the ingredients and changes may also be made in the manner of compounding the ingredients, all without departing from the spirit of the invention. For instance as to an ingredient that may be omitted, I have found that for certain applications the use of clay is not always necessary and may be left out from the compounding. This is because when the expanded vermiculite (b) has been thoroughly digested in the dilute sulphuric acid-fluorspar reagent, (a), it constitutes a more or less plastic but greatly viscous mass possessed of cementitious binding power, the object of using clay principally being to impart to this viscous cementitious mass a higher degree of plasticity permitting or sharper and more accurate moulding.

Similarly as to other ingredients that may be employed it has been found that if it is desired to impart to the final burnt article a higher degree of crushing strength together with a higher degree of refractoriness the clay in the examples as herebefore described may be either partially or totally substituted by native chromite of iron. Further as to the changes that may be made in the proportions of the ingredients to suit the varying requirements of thermo-technical exigencies the two examples as herebefore described already clearly demonstrate and if it is considered that these two examples practically constitute nearly two extremes, it will be readily understood that the variations within their limits alone may be fairly wide. Finally as to the changes that may be made in the manner of compounding the ingredients it has been found advantageous for instance, when low density is of primordial importance, to eliminate by filtering and pressing the precipitate of calcium sulphate which forms when the diluted sulphuric acid has reacted with the fluor spar as described sub (a) in the two examples as herebefore given, and to use the resultant liquid filtrate as reagent by itself and to substitute for the weight of the precipitate so eliminated an equal weight of the liquid filtrate.

The compounding of the two examples herebefore described will in this case become respectively as follows:

*Example 1*

| | Per cent |
|---|---|
| (a) Reagent liquid filtrate | 56.00 |
| To which (a) is added for digestion: | |
| (b) Expanded vermiculite | 20.00 |
| | 76.00 |
| To which (a) and (b) is added after digestion: | |
| (c) Expanded vermiculite | 4.50 |
| Ground cork | 5.50 |
| Clay (either blue ball, china or bentonite) | 14.00 |
| | 100.00 |

*Example 2*

| | Per cent |
|---|---|
| (a) Reagent liquid filtrate | 57.00 |
| To which (a) is added for digestion: | |
| (b) Expanded vermiculite | 6.25 |
| | 63.25 |
| To which (a) and (b) is added after digestion: | |
| (c) Expanded vermiculite | 18.75 |
| Ground cork | 4.00 |
| Clay (either blue ball, china or bentonite) | 14.00 |
| | 100.00 |

In these two cases however, there is a difference in the mode of procedure of digesting the expanded vermiculite (b) with the reagent liquid filtrate (a) which latter, after reaction, having been freed from its precipitated calcium sulphate by filtering and pressing as herebefore described, will be in a cold state and in which state the digesting of the expanded vermiculite (b) therein must be accelerated by heat. In order to perform this, the expanded vermiculite (b) is thoroughly mixed together with the reagent liquid filtrate (a) in a suitable container which latter is then heated in a water-bath for a suitable duration of time, the latter depending on the quantity of the mixture to be digested; obviously the water bath is a mere example and can be replaced by any other suitably corresponding method such as for instance a double-jacketed mixing pan supplied wtih steam and the like.

When the digestion is completed, to this mixture, which now constitutes a viscous cementitious mass, is added the various ingredients as described in the two examples sub (c) and the whole is mixed thoroughly together after which moulding, drying and burning is proceeded with in the manner as heretofore described.

I claim:

1. Process for the manufacture of fireproof articles with thermal and acoustic insulating properties, consisting of treating a hydrofluoric acid derivative such as fluorspar with an aqueous solution of sulphuric acid, digesting in the liquor thus formed a quantity of an expanded micaceous mineral, adding subsequently to the mixture a further quantity of expanded micaceous mineral together with ground cork to form a plastic mass, forming an article from said mass by moulding, and drying and burning the moulded article.

2. Process for the manufacture of fireproof articles with thermal and acoustic insulating properties, consisting of treating a hydrofluoric acid derivative such as fluorspar with an aqueous solution of sulphuric acid, digesting in the liquor thus formed a quantity of an expanded vermiculite micaceous mineral, adding subsequently to the mixture a further quantity of expanded vermiculite micaceous mineral together with ground cork to form a plastic mass, forming an article from said mass by moulding, and drying and burning the moulded article.

3. Process for the manufacture of fireproof articles with thermal and acoustic insulating properties, consisting of treating a hydrofluoric acid derivative such as fluorspar with an aqueous solution of sulphuric acid to form a reagent liquor, choosing the proportions of said hydrofluoric acid derivative and of sulphuric acid such that the specific gravity of said liquor is substantially 25° Bé and such that the proportion of sulphuric acid to hydrofluoric acid is substantially two to one, digesting in said liquor a quantity of an expanded micaceous mineral, adding subsequently to the mixture a further quantity of expanded micaceous mineral together with ground cork to form a plastic mass, forming an article from said mass by moulding, and drying and burning the moulded article.

4. Process for the manufacture of fireproof articles with thermal and acoustic insulating properties, consisting of treating a hydrofluoric acid derivative such as fluorspar with an aqueous solution of sulphuric acid, digesting in the liquor thus formed a quantity of an expanded micaceous mineral, adding subsequently to the mixture a further quantity of expanded micaceous mineral together with ground cork and a plasticiser to form a plastic mass, forming an article from said mass by moulding, and drying and burning the moulded article.

5. Process according to claim 4, wherein said plasticiser is constituted by clay.

6. Process according to claim 4, wherein said plasticiser is constituted by a mixture of clay and iron chromite.

7. Process according to claim 1, wherein iron chromite is added to said plastic mass.

8. Process for the manufacture of fireproof articles with thermal and acoustic insulating properties, consisting of treating fluorspar with an aqueous solution of sulphuric acid, removing from the liquor thus formed the resultant calcium sulphate, digesting in said liquor a quantity of an expanded micaceous mineral, adding subsequently to the mixture a further quantity of expanded micaceous mineral together with ground cork to form a plastic mass, forming an article from said mass by moulding, and drying and burning the moulded article.

9. Process for the manufacture of fireproof articles with thermal and acoustic insulating properties, consisting of treating a hydrofluoric acid derivative such as fluorspar with an aqueous solution of sulphuric acid to form a reagent liquor containing hydrofluoric acid, choosing the proportions of said hydrofluoric acid derivative and of sulphuric acid such that the specific gravity of said liquor is substantially 25° Bé. and such that the proportion of sulphuric acid to hydrofluoric acid is substantially two to one, digesting in said liquor a quantity of an expanded vermiculite micaceous mineral, adding subsequently to the mixture a further quantity of expanded vermiculite micaceous mineral together with ground cork and a plasticiser to form a plastic mass, forming an article from said mass by moulding, and drying and burning the moulded article.

10. Process according to claim 9, wherein said hydrofluoric acid derivative is fluorspar in a finely ground state.

11. Process according to claim 9, wherein said moulded article is burnt at substantially 1150° C.

12. Process for the manufacture of fireproof articles with thermal and acoustic insulating properties, consisting of mixing a hydrofluoric acid derivative with an aqueous solution of sulphuric acid, digesting in the hot mixture during the reaction a quantity of an expanded micaceous mineral, adding subsequently to the mixture a further quantity of expanded micaceous mineral together with ground cork to form a plastic mass, forming an article from said mass by molding, and drying and burning the molded article.

CONRAD GÉRARD FRANÇOIS CAVADINO.